(12) United States Patent  
Matsumoto (10) Patent No.: US 7,710,747 B2  
(45) Date of Patent: May 4, 2010

(54) VOLTAGE-SOURCE INVERTER APPARATUS UTILIZING RIPPLE VOLTAGE

(75) Inventor: Yoshihiro Matsumoto, Mie (JP)

(73) Assignee: Fuji Electric Systems Co., Ltd., Tokyo (JP)

( * ) Notice: Subject to any disclaimer, the term of this patent is extended or adjusted under 35 U.S.C. 154(b) by 68 days.

(21) Appl. No.: 11/951,443

(22) Filed: Dec. 6, 2007

(65) Prior Publication Data

US 2008/0151583 A1    Jun. 26, 2008

(30) Foreign Application Priority Data

Dec. 11, 2006    (JP)    ............... 2006-333480

(51) Int. Cl.
    *H02J 3/36*    (2006.01)
(52) U.S. Cl. ............... 363/35; 363/46; 363/37
(58) Field of Classification Search ............ 363/35, 363/46, 37
    See application file for complete search history.

(56) References Cited

U.S. PATENT DOCUMENTS

| 4,807,102 | A |   | 2/1989 | Serras-Paulet |
| 4,978,894 | A | * | 12/1990 | Takahara ............ 318/768 |
| 5,014,177 | A | * | 5/1991 | Nuechterlein ........ 363/45 |
| 5,155,671 | A | * | 10/1992 | Inaba et al. ........ 363/37 |
| 5,416,686 | A | * | 5/1995 | Azuma et al. ....... 363/37 |
| 6,084,786 | A | * | 7/2000 | Rozman ............. 363/48 |
| 6,307,759 | B1 | * | 10/2001 | Inarida et al. ...... 363/37 |
| 6,437,997 | B1 | * | 8/2002 | Inarida et al. ...... 363/37 |
| 6,690,587 | B2 | * | 2/2004 | Hur et al. .......... 363/41 |

FOREIGN PATENT DOCUMENTS

| DE | 10 2004 042 312 | 1/2008 |
| JP | 03-277180 A | 2/1991 |
| JP | 05-103494 A | 4/1993 |

OTHER PUBLICATIONS

German Patent Office issued an German Office Action dated Nov. 11, 2009, Application No. 10 2007 058 969.9-32.

* cited by examiner

*Primary Examiner*—Shawn Riley  
(74) *Attorney, Agent, or Firm*—Young & Thompson (57) ABSTRACT

An inverter apparatus that can lengthen a lift span provides only a noise absorption film capacitor in a DC intermediate circuit between rectifying and inverter circuits, instead of a conventional electrolytic capacitor. In a voltage command generating unit, when a frequency set by a frequency setting unit is within a predetermined range including the frequency of an AC input power supply, PLL control is performed to make the frequency set by an output voltage command signal equal to the frequency of the AC input power supply voltage, and to substantially synchronize the peak value of the inverter circuit output voltage with the peak value of a voltage formed between both ends of the film capacitor. Accordingly, output voltage amplitude is generated when the frequency set by the output voltage command signal equals the frequency of the voltage of the AC input power supply.

20 Claims, 10 Drawing Sheets

VOLTAGE-SOURCE INVERTER APPARATUS UTILIZING RIPPLE VOLTAGE

BACKGROUND OF THE INVENTION

1. Field of the Invention

The present invention relates to an inverter apparatus that rectifies a three-phase AC voltage of an AC input power supply using a rectifying circuit, converts the rectified voltage into a three-phase AC voltage having predetermined frequency and amplitude, on the basis of an output voltage command signal, using an inverter circuit that is subjected to pulse width modulation control, and supplies the three-phase AC voltage to a load.

2. Description of the Related Art

Figure 9:
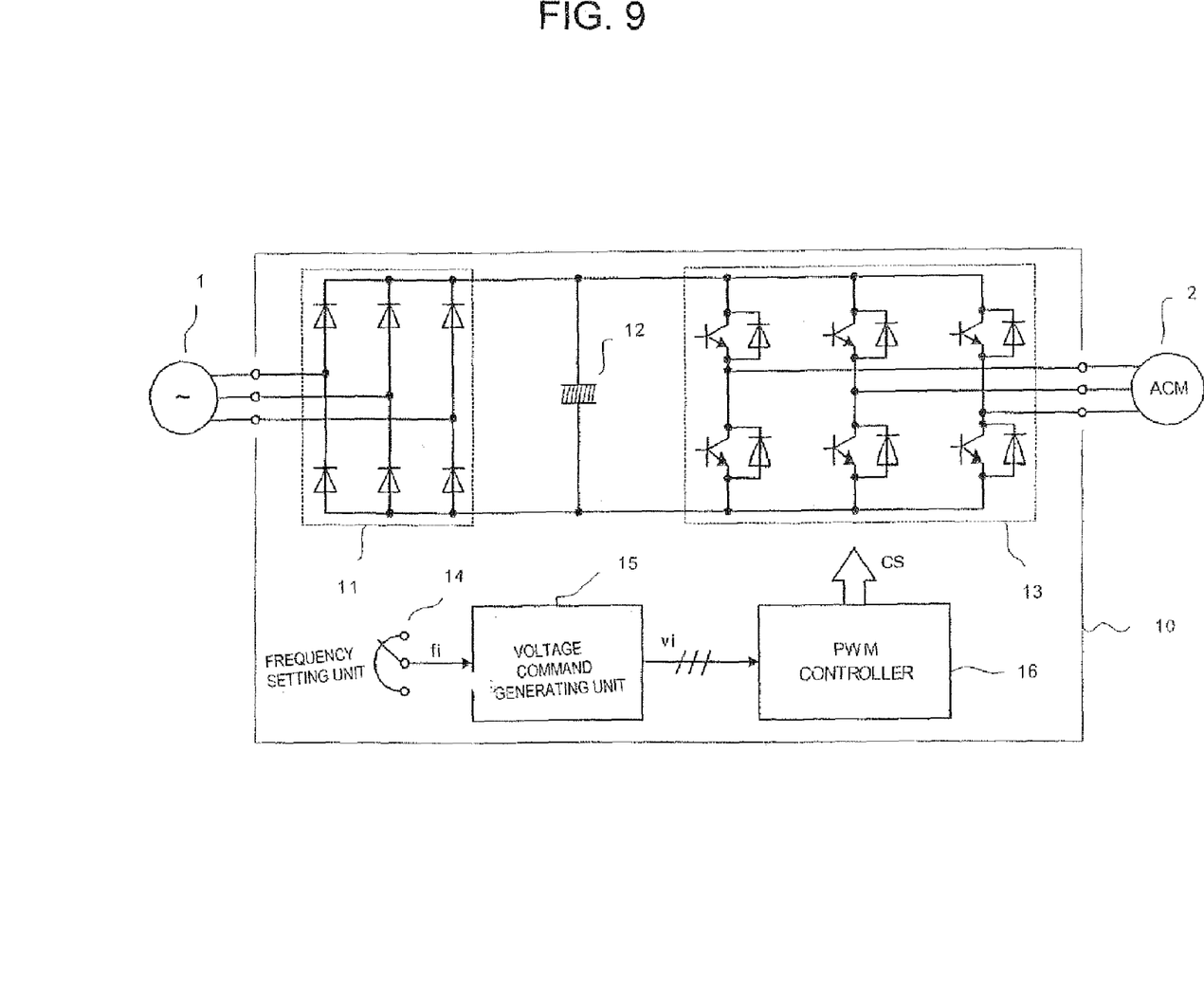
FIG. 9 is a circuit diagram illustrating an inverter apparatus according to the related art.

FIG. 9 is a circuit diagram illustrating an inverter apparatus according to the related art that converts a three-phase AC voltage from an AC input power supply 1, which is a commercial power supply, into a three-phase AC voltage having a predetermined frequency and supplies the converted three-phase AC voltage to an AC motor 2, which is a load.

In an inverter apparatus 10 shown in FIG. 9, reference numeral 11 indicates a rectifying circuit composed of a three-phase bridge rectifier circuit including diodes for rectifying the three-phase AC voltage of the AC input power supply 1. Reference numeral 12 indicates an electrolytic capacitor for smoothing the voltage rectified by the rectifying circuit 11. Reference numeral 13 indicates an inverter circuit that is formed by connecting anti-parallel circuits, each composed of a diode and a transistor, in a three-phase bridge manner and performs pulse width modulation (PWM) control, which will be described later, on a voltage formed between both ends of the electrolytic capacitor 12 to generate a three-phase AC voltage having predetermined frequency and amplitude. Reference numeral 14 indicates a frequency setting unit that sets the frequency of the three-phase AC voltage output from the inverter circuit 13. Reference numeral 15 indicates a voltage command generating unit that generates a three-phase sine wave output voltage command signal vi having a frequency corresponding to a frequency command value fi set by the frequency setting unit 14 and an amplitude corresponding to the generated frequency. Reference numeral 16 indicates a PWM controller that compares the output voltage command signal vi from the voltage command generating unit 15 with, for example, a chopping wave carrier signal and generates an inverter control signal whose pulse width is modulated to control the on or off states of the transistors of the inverter circuit 13.

Figure 10:
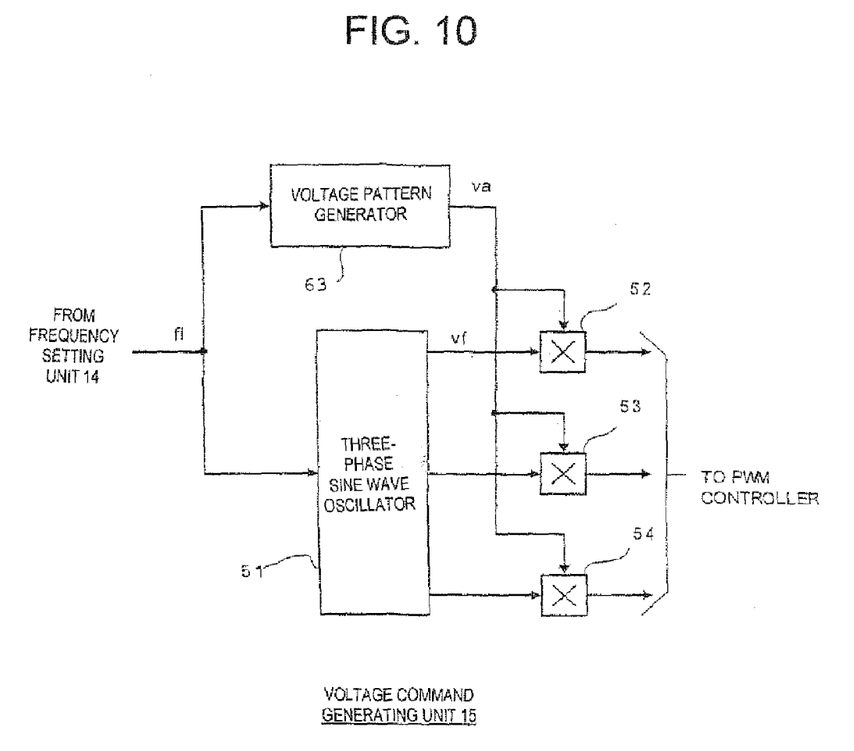
FIG. 10 is a circuit diagram illustrating the detailed circuit structure of a portion of the inverter apparatus shown in FIG. 9.

As shown in FIG. 10, the voltage command generating unit 15 includes a three-phase sine wave oscillator 51, multipliers 52 to 54, and a voltage pattern generator 63. The three phase sine wave oscillator 51 of the voltage command generating unit 15 generates a three-phase sine wave voltage having a constant amplitude and a frequency corresponding to the frequency command value fi set by the frequency setting unit 14. In addition, for example, when the AC motor 2 is controlled such that a primary voltage (V) thereof is proportional to a primary frequency (f) (V/f constant control), when a torque boost compensation function at a low speed is additionally provided to the AC motor 2 in the V/f constant control, or when the AC motor 2 for driving a load having a square diminishing torque load characteristic is controlled, the voltage pattern generator 55 outputs a voltage amplitude command value va corresponding to the frequency command value fi input from the frequency setting unit 14, according to a voltage pattern indicating the relationship between an output voltage Vo and a predetermined output frequency fo of the inverter circuit.

The voltage command generating unit 15 multiplies the voltage amplitude command value va output from the voltage pattern generator 63 by a voltage vf corresponding a three-phase sine wave frequency output from the three-phase sine wave oscillator 51 by using the multipliers 52 to 54 to generate a three-phase sine wave voltage command signal vi having a frequency and an amplitude respectively corresponding to the frequency command value fi set by the frequency setting unit 14 and the voltage amplitude command value va generated by the voltage pattern generator 63. Then, the voltage command generating unit 15 outputs the three-phase sine wave voltage command signal vi to the PWM controller 16.

In the inverter apparatus 10 shown in FIG. 9 according to the related art, the smoothing capacitor 12 needs to have sufficiently large capacitance to smooth the voltage rectified by the rectifying circuit 11 into a DC voltage. Therefore, an electrolytic capacitor is used as the smoothing capacitor 12.

However, as known in the art, since the electrolytic capacitor is a part that is consumed with time, it has a shorter life span than other components. When the electrolytic capacitor is used in the inverter apparatus 10 for a long time, it is necessary to replace the smoothing capacitor 12 composed of the electrolytic capacitor with a new one in order to maintain the performance of the inverter apparatus, which results in an increase in maintenance costs.

In order to solve this problem, an inverter apparatus disclosed in JP-A-3-277180 includes a capacitor for absorbing a noise current caused by the switching operation of an inverter circuit, in addition to the electrolytic capacitor, in order to prevent the noise current from flowing through the electrolytic capacitor. According to the inverter apparatus disclosed in JP-A-3-277180, since the current flowing through the electrolytic capacitor is reduced, a load applied to the electrolytic capacitor is reduced, as compared to the conventional inverter apparatus shown in FIG. 9, which makes it possible to lengthen a life span. However, in this case, the overall size of the inverter apparatus increases due to the added capacitor for absorbing the noise current.

Further, JP-A-5-103494 discloses an inverter apparatus including only a smoothing capacitor having small capacitance in a rectifying circuit, without using the electrolytic capacitor.

In the inverter apparatus disclosed in JP-A-5-103494, since the smoothing capacitor has small capacitance, a high ripple voltage is included in a DC voltage rectified by a DC intermediate circuit. When the DC voltage varies due to the ripple voltage, a beat phenomenon occurs in an output current from the inverter apparatus due to the variation in the DC voltage.

In order to prevent the beat phenomenon of the output current caused by the variation in the DC voltage output from the DC intermediate circuit, the inverter apparatus disclosed in JP-A-5-103494 detects a voltage between both ends of the smoothing capacitor, and corrects a voltage amplitude command signal or a frequency command signal input to the inverter circuit, on the basis of the detected voltage.

However, the inverter apparatus disclosed in JP-A-5-103494 has a problem in that the maximum output voltage of the inverter apparatus is restricted by the ripple voltage included in the DC voltage from the DC intermediate circuit and an insufficient voltage is output from the inverter apparatus in a section in which the output voltage is high.

SUMMARY OF THE INVENTION

The invention is designed to solve the above problems of the inverter apparatuses according to the related art, and an object of the invention is to provide an inverter apparatus capable of increasing the peak of an output voltage up to the peak of a ripple voltage of a DC voltage output from a DC intermediate circuit in a section in which the output voltage is high.

In order to achieve the abovementioned object, according to an aspect of the invention, an inverter apparatus includes: a rectifying circuit that rectifies a three-phase AC voltage of an AC input power supply; a voltage command generating unit that generates a voltage command signal having a frequency set by a frequency setting unit; and an inverter circuit that converts a DC voltage rectified by the rectifying circuit into a three-phase AC voltage having predetermined frequency and amplitude, which is subjected to pulse width modulation (PWM) control, on the basis of the output voltage command signal generated by the voltage command generating unit. In the inverter apparatus, the voltage command generating unit is provided with a voltage synchronizing unit that synchronizes the output voltage command signal generated by the voltage command generating unit with a ripple voltage generated by a DC intermediate circuit provided between the rectifying circuit and the inverter circuit.

In the inverter apparatus according to the above-mentioned aspect, preferably, when the frequency of the output voltage command signal is within a predetermined range including the frequency of the voltage of the AC input power supply, the voltage synchronizing unit fixes the frequency of the output voltage command signal to a frequency that is equal to the frequency of the voltage of the AC input power supply, and synchronizes the output voltage command signal with the ripple voltage of the DC intermediate circuit.

In the inverter apparatus according to the above-mentioned aspect, when the frequency of the output voltage command signal is within a predetermined range including the frequency of the voltage of the AC input power supply and only when a current output from the inverter circuit is larger than a predetermined upper limit, the voltage synchronizing unit fixes the frequency of the output voltage command signal to a frequency that is equal to the frequency of the voltage of the AC input power supply, and synchronizes the output voltage command signal with the ripple voltage of the DC intermediate circuit.

In the inverter apparatus according to the above-mentioned aspect, preferably, the voltage synchronizing unit detects the phase of the voltage of the AC input power supply and synchronizes the output voltage command signal with the ripple voltage of the DC intermediate circuit on the basis of the detected phase. Preferably, the voltage synchronizing unit detects the phase of the ripple voltage and synchronizes the output voltage command signal with the ripple voltage of the DC intermediate circuit on the basis of the detected phase.

In the inverter apparatus according to the above-mentioned aspect, preferably, the voltage command generating unit includes a voltage correcting unit that corrects the voltage of the output voltage command signal on the basis of the ripple voltage of the DC intermediate circuit.

When the capacitance of a capacitor for smoothing an output voltage from a rectifying circuit is reduced, a ripple voltage included in a DC voltage output from a DC intermediate circuit increases. However, an inverter apparatus of the invention is provided with a voltage synchronizing unit that synchronizes an output voltage command signal generated by a voltage command generating unit with the ripple voltage generated by the DC intermediate circuit provided between the rectifying circuit and the inverter circuit in order to synchronize an output voltage from the inverter apparatus with the ripple voltage of the DC intermediate circuit. Therefore, even when the DC voltage of the intermediate circuit varies due to the ripple voltage, it is possible to increase the peak value of the output voltage from the inverter apparatus up to the peak value of the ripple voltage included in the DC voltage of the DC intermediate circuit, and thus prevent an overcurrent due to the insufficiency of the output voltage.

According to the invention, since it is unnecessary to increase the capacitance of the smoothing capacitor, the electrolytic capacitor is not needed. Therefore, the smoothing capacitor can be composed of a film capacitor having a long life span, which makes it possible to reduce maintenance efforts for the smoothing capacitor of the inverter apparatus and maintenance costs.

Further, since the inverter apparatus according to the invention is provided with the voltage correcting unit, it is possible to correct a variation in the amplitude of the output voltage from the inverter apparatus due to the ripple voltage.

DESCRIPTION OF THE PREFERRED EMBODIMENTS

Figure 1:
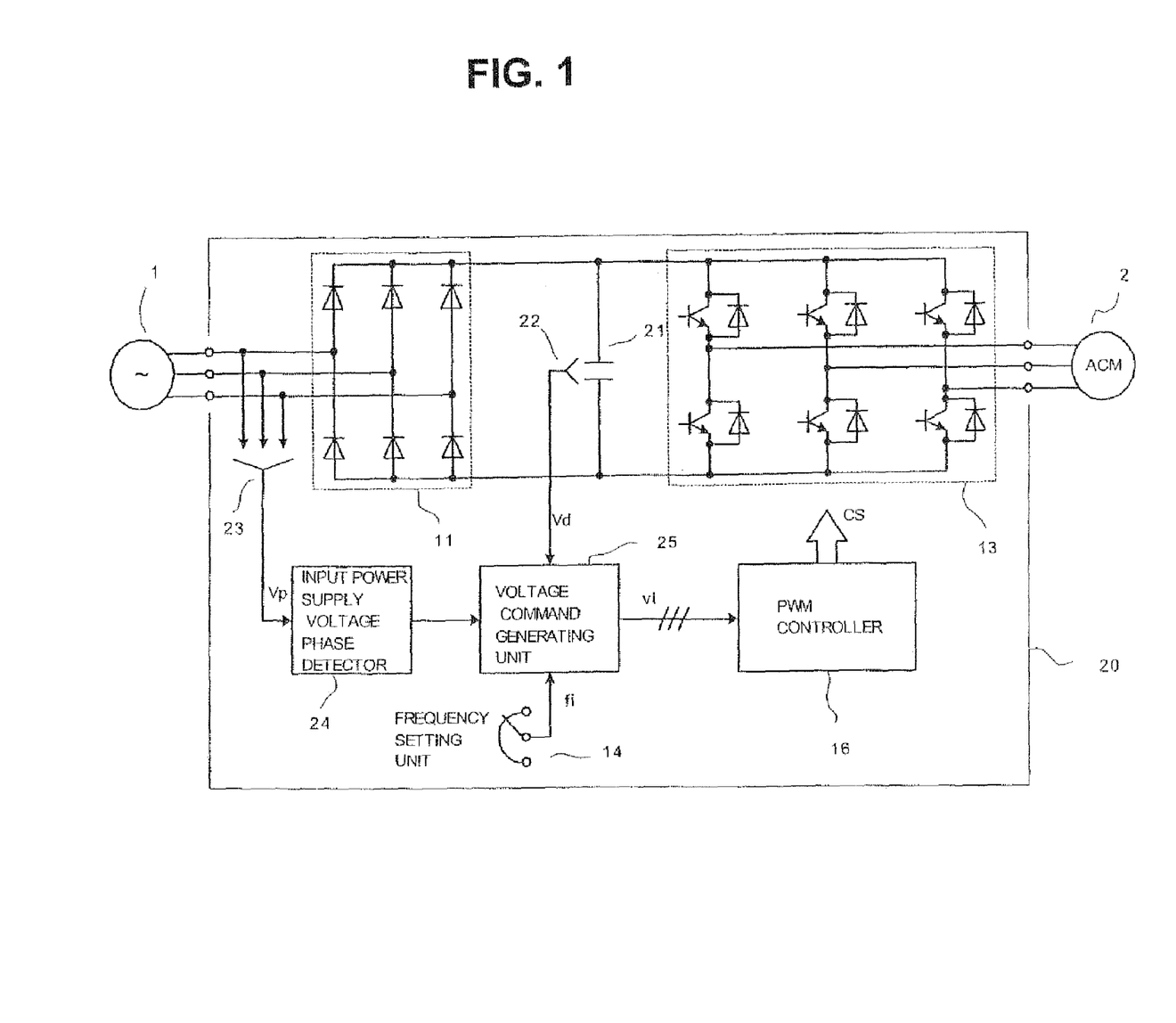
FIG. 1 is a circuit diagram illustrating an inverter apparatus according to a first embodiment of the invention.

FIG. 1 is a circuit diagram illustrating an inverter apparatus according to a first embodiment of the invention. In FIG. 1, components having the same functions as those in FIG. 9 are denoted by the same reference numerals, and a detailed description thereof will be omitted.

An inverter apparatus 20 shown in FIG. 1 includes a film capacitor 21 that absorbs noise generated due to the switching operation of an inverter circuit 13 and has a smaller capacitance than the electrolytic capacitor 12 shown in FIG. 9, instead of the electrolytic capacitor 12, thereby reducing the capacitance of a smoothing capacitor. The inverter apparatus 20 includes a DC voltage detector 22 that detects a voltage formed between both ends of the film capacitor 21, an AC voltage detector 23 that detects a voltage of an AC input power supply 1, and an AC input power supply voltage phase detector 24 that detects the phase of the voltage of the AC input power supply on the basis of a detection value of the AC voltage detector 23, in addition to the components shown in FIG. 9. In addition, the inverter apparatus 20 further includes a voltage command generating unit 25 instead of the voltage command generating unit 15 shown in FIG. 9.

Figure 2:
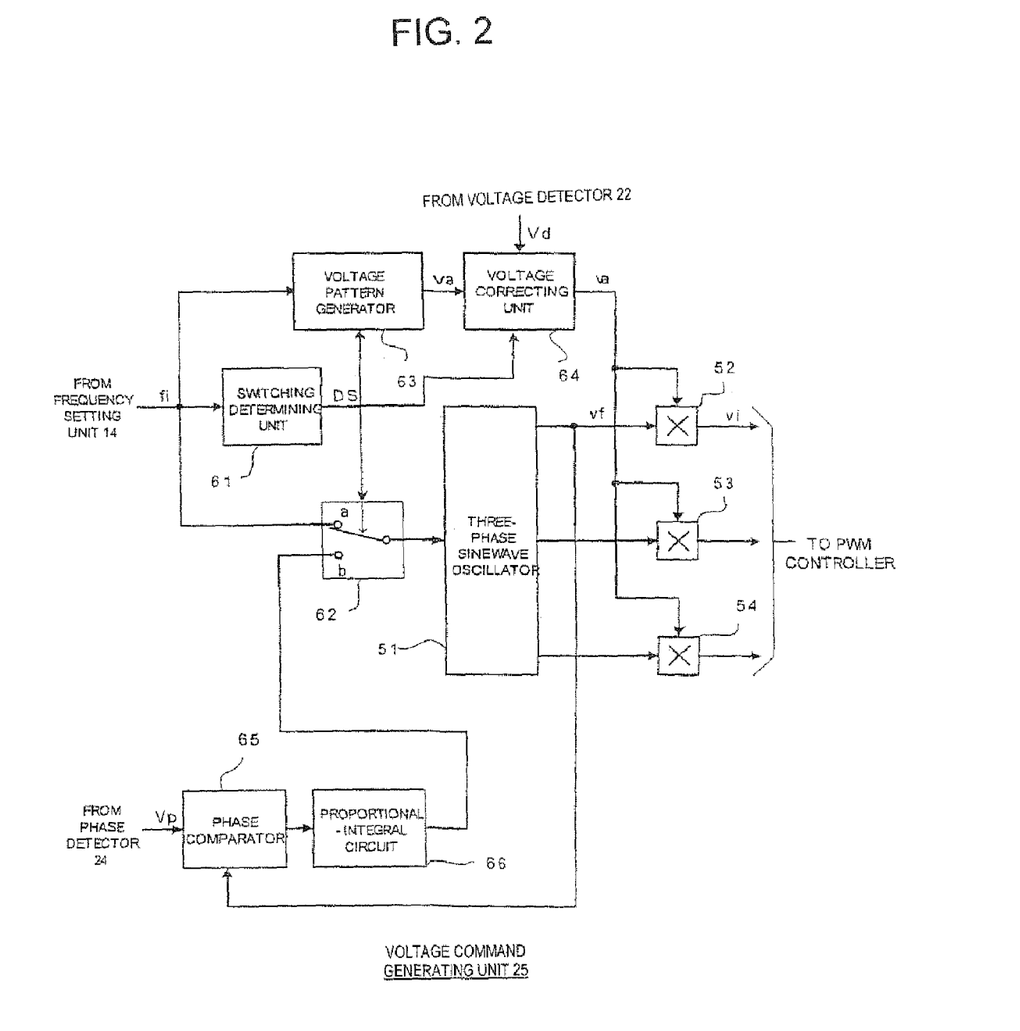
FIG. 2 is a circuit diagram illustrating the detailed circuit structure of a portion of the inverter apparatus shown in FIG. 1.

FIG. 2 shows the detailed circuit structure of the voltage command generating unit 25. In FIG. 2, components having the same functions as those in FIG. 10 are denoted by the same reference numerals, and a detailed description thereof will be omitted.

As shown in FIG. 2, the voltage command generating unit 25 includes a three-phase sine wave oscillator 51, multipliers 52 to 54, a switching determining unit 61, a switch 62, a voltage pattern generator 63, a voltage correcting unit 64, a phase comparator 65, and a proportional-integral circuit 66. The phase comparator 65, the proportional-integral circuit 66, the switch 62, and the three-phase sine wave oscillator 51 are connected in a closed loop to form a phase locked loop (PLL) circuit.

Figure 3:
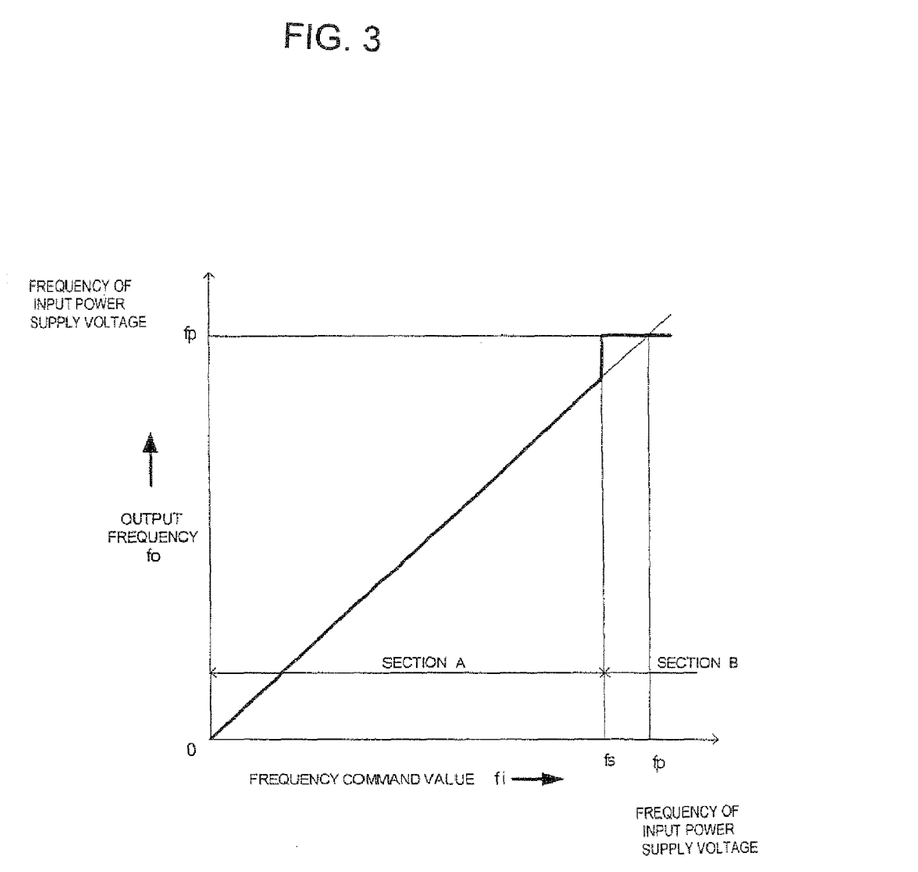
FIG. 3 is a characteristic diagram illustrating the operation of the inverter apparatus shown in FIG. 1.

FIG. 3 is a characteristic diagram illustrating the relationship between an output frequency fo of the inverter apparatus 20 and a frequency command value fi based on a set value of the frequency setting unit 14 of the voltage command generating unit 25.

The switching determining unit 61 of the voltage command generating unit 25 shown in FIG. 2 determines the magnitude of the frequency command value fi input from the frequency setting unit 14, using a predetermined frequency fs that is about 85 to 90% of the frequency fp of an AC input power supply voltage shown in FIG. 3 as a reference value. Then, the switching determining unit 61 generates a determining signal DS when the frequency command value fi is equal to or higher than the frequency fs, and outputs the determining signal DS to the switch 62, the voltage pattern generator 63, and the voltage correcting unit 64.

The switch 62 connects a switching contact to a contact a that is connected to the frequency setting unit 14 such that the frequency command value fi is input to the three-phase sine wave oscillator 51, until the determining signal DS is received from the switching determining unit 61. When the determining signal DS is received from the switching determining unit 61, the switch 62 switches the switching contact to a contact b to connect the phase comparator 65, the proportional-integral circuit 66, and the three-phase sine wave oscillator 51 in a closed loop, thereby forming a PLL circuit that uses the phase of the AC input power supply voltage detected by the phase detector 24 as a reference phase.

Until the determining signal DS is received from the switching determining unit 61, the voltage pattern generator 63 generates a voltage amplitude command value va corresponding to the frequency command value fi that is input from the frequency setting unit 14 according to a predetermined frequency-voltage pattern. When the determining signal DS is received from the switching determining unit 61, the voltage pattern generator 63 generates a predetermined voltage amplitude command value vap corresponding to the frequency fp of the voltage of the AC input power supply 1, regardless of an input frequency command value fi.

The voltage correcting unit 64 divides the voltage amplitude command value va output from the voltage pattern oscillator 63 by a DC voltage Vd of a DC intermediate circuit that is detected by the DC voltage detector 22 and corrects the voltage amplitude command value va according to a voltage variation due to a ripple voltage included in DC voltage rectified by the DC intermediate circuit, that is, a rectifying circuit. The correcting operation stops when the determining signal DS is received.

Next, the operation of the inverter apparatus 20 having the above-mentioned structure will be described below with reference to the characteristic diagram shown in FIG. 3 and waveform diagrams of FIGS. 4A and 4B showing the DC voltage Vd of the DC intermediate circuit and an output voltage Vo of the inverter apparatus.

When the frequency command value fi set by the frequency setting unit 14 is less than a predetermined frequency fs shown in FIG. 3 (section A), the switching determining unit 61 does not generate the determining signal DS. Therefore, the switching contact is connected to the contact a that is connected to the frequency setting unit in the switch 62. Then, the frequency command value fi set by the frequency setting unit 14 is input to the three-phase sine wave oscillator 51, and the three-phase sine wave oscillator 51 generates a sine wave voltage vf having a constant amplitude and a frequency corresponding to the frequency command value fi, and outputs the sine wave voltage vf to the multipliers 52 to 54.

In this case, since the voltage pattern generator 63 does not receive the determining signal DS, it performs a normal operation to generate an output voltage amplitude command value va corresponding to the input frequency command value fi according to a predetermined voltage pattern. Then, the voltage correcting unit 64 corrects the output voltage amplitude command value va into an output voltage amplitude command value va' on the basis of the DC voltage Vd of the DC intermediate circuit that is detected by the DV voltage detector 22, and outputs the output voltage amplitude command value va' to the multipliers 52 to 54.

The multipliers 52 to 54 multiply the sine wave voltage vf output from the three-phase sine wave oscillator 51 by the corrected output voltage amplitude command value va' to generate an output voltage command signal vi, and output the output voltage command signal vi to a PWM controller 16. The PWM controller 16 modulates the pulse width of the output voltage command signal vi to generate an inverter control signal CS, which is used to control the on or off states of transistors of the inverter circuit 13. Then, the inverter circuit 13 generates a sine wave AC output voltage Vo having an amplitude and a frequency instructed by the output voltage command signal vi.

As shown in FIG. 3, when the frequency command value fi is less than a predetermined frequency fs (section A), the output frequency fo of the inverter apparatus 20 is proportional to the frequency command value fi set by the frequency setting unit 14.

When the frequency command value fi set by the frequency setting unit 14 is in a predetermined range (section B) that is more than the predetermined frequency fs and includes a frequency fp of the voltage of the AC input power supply 1, the switching determining unit 61 determines the range of the frequency command value fi and generates the determining signal DS. Then, the switch 62 switches the switching contact to a contact b that is connected to the proportional-integral circuit 66, so that the PLL circuit is formed and PLL control starts. In this state, the output frequency of the three-phase sine wave oscillator 51 is controlled such that the phase of the voltage Vp of the AC input power supply 1 detected by the phase detector 24 is equal to the phase of the voltage command vf output from the three-phase sine wave oscillator 51. Therefore, the output voltage command vf of the three-phase sine wave oscillator 51 and the voltage Vp of the AC input power supply 1 are synchronized with each other to have the same frequency and phase. As a result, as shown in FIG. 3, in the section B in which the frequency command value fi is more than the frequency fs, the output frequency fo of the inverter apparatus 20 is fixed to a frequency that is equal to the frequency fp of the voltage of the AC input power supply 1, regardless of the frequency fi instructed by the output voltage command vf.

When receiving the determining signal DS, the voltage pattern generator 63 generates the output voltage amplitude command value va corresponding to the frequency fp of the voltage of the AC input power supply 1, as described above. Since the voltage correcting unit 64 stops the correcting operation when receiving the determining signal DS, the voltage amplitude command value va generated by the voltage pattern generator 63 is input to the multipliers 52 to 54 without any change. Then, the multipliers 52 to 54 multiply the voltage command vf output from the three-phase sine wave oscillator 51 by the voltage amplitude command value va to generate the output voltage command signal vi. The output voltage command signal vi instructs the inverter circuit to generate a frequency and a voltage amplitude value that are respectively equal to the frequency fp of the AC input power supply voltage Vp and the voltage amplitude value vp.

Figure 4:
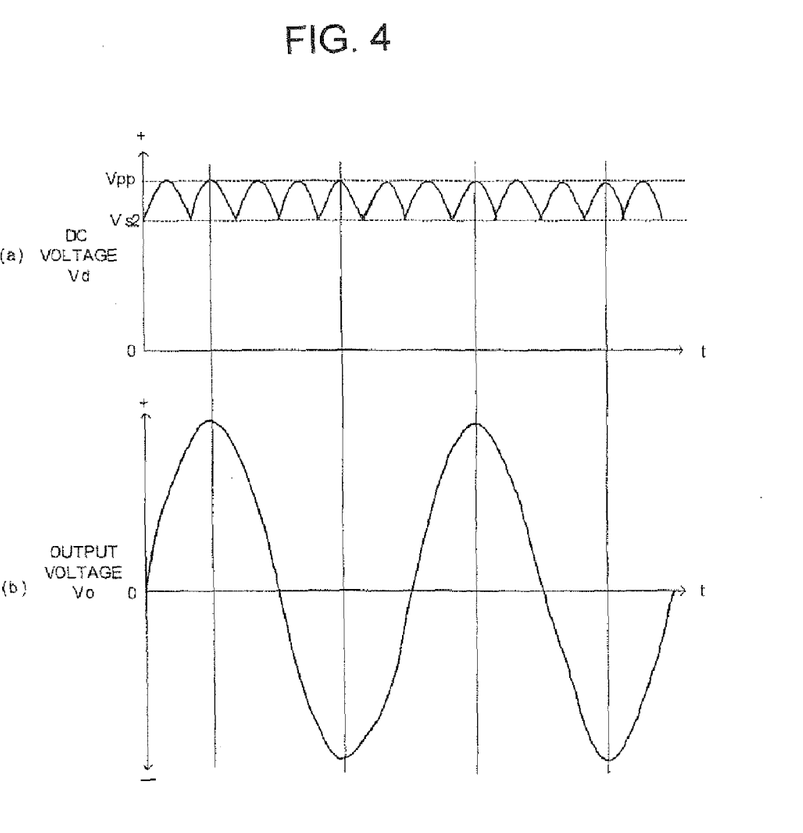
FIG. 4 is a waveform diagram illustrating the operation of the inverter apparatus shown in FIG. 1.

Therefore, as shown in FIG. 3, when the frequency command value fi is more than a predetermined frequency fs (the section B), the output frequency fo of the inverter apparatus 20 is fixed to a frequency that is equal to the frequency fp of the voltage of the AC input power supply 1. As a result, the phase and height (amplitude) of a peak of the output voltage Vo are equal to the phase and height (amplitude) of apeakof the ripple voltage included in the DC voltage Vd of the DC intermediate circuit, as shown in FIG. 4, so that the output voltage Vo is synchronized with the ripple voltage included in the DV voltage Vd.

Since the amplitude (peak) of the output voltage Vo of the inverter apparatus 20 increases until it is equal to the peak of the ripple voltage of the DC intermediate circuit, there is no insufficiency of the maximum output voltage. Therefore, an over-current does not occur due to the insufficiency of the output voltage from the inverter apparatus. As a result, it is possible to prevent the inverter apparatus 20 or an AC motor 2, which is a load, from burning out due to the over-current.

In the voltage command generating unit 25, the voltage correcting unit 64 divides the output voltage amplitude command value from the voltage pattern generator 63 by the detection value of the DC voltage detector 22, and performs correcting control, that is, automatic voltage regulation (AVR) control using the divided result as an amplitude command value of a new output voltage command signal. Therefore, the output voltage of the inverter apparatus is not affected by a voltage variation due to the ripple voltage of the DC intermediate circuit.

Figure 5:
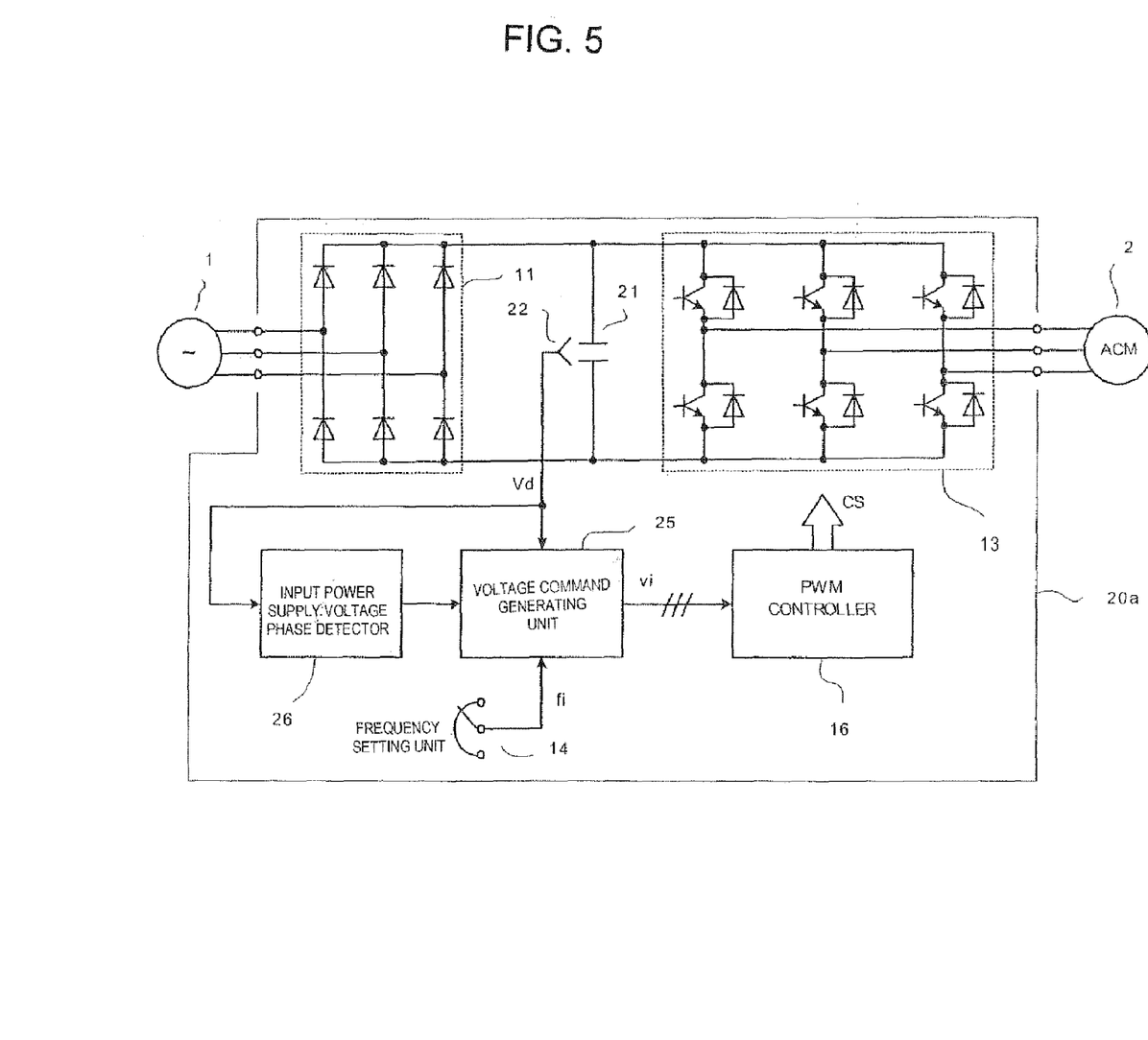
FIG. 5 is a circuit diagram illustrating an inverter apparatus according to a second embodiment of the invention.

FIG. 5 is a circuit diagram illustrating an inverter apparatus according to a second embodiment of the invention. In FIG. 5, components having the same functions as those in FIG. 1 are denoted by the same reference numerals.

An inverter apparatus 20a shown in FIG. 5 includes an AC input power supply voltage phase detector 26 instead of the AC input power supply voltage phase detector 24. The AC input power supply voltage phase detector 26 detects the phase of the voltage of the AC input power supply 1 on the basis of a ripple voltage (see FIG. 4) of the rectified voltage that is included in the detection value of the DC voltage detector 22.

Therefore, the AC voltage detector 23 of the inverter apparatus 20 shown in FIG. 1 can be omitted in the inverter apparatus 20a.

Figure 6:
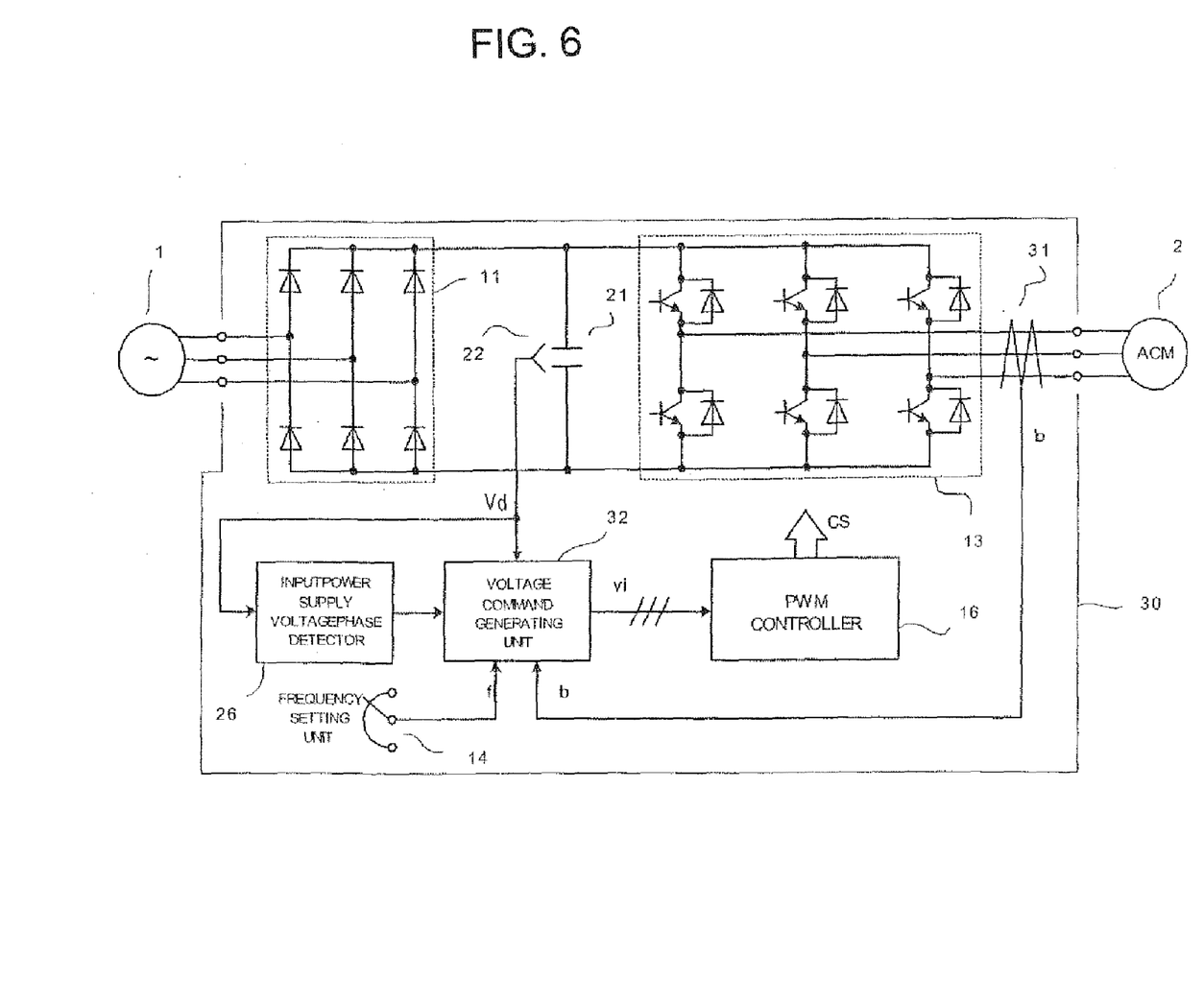
FIG. 6 is a circuit diagram illustrating an inverter apparatus according to a third embodiment of the invention.

FIG. 6 is a circuit diagram illustrating an inverter apparatus according to a third embodiment of the invention. In FIG. 6, components having the same functions as those in the second embodiment shown in FIG. 5 are denoted by the same reference numerals, and a detailed description thereof will be omitted.

An inverter apparatus 30 shown in FIG. 6 is additionally provided with an AC detector 31 that detects an output current of an inverter circuit 13 and also includes a voltage command generating unit 32 instead of the voltage command generating unit 25.

Figure 7:
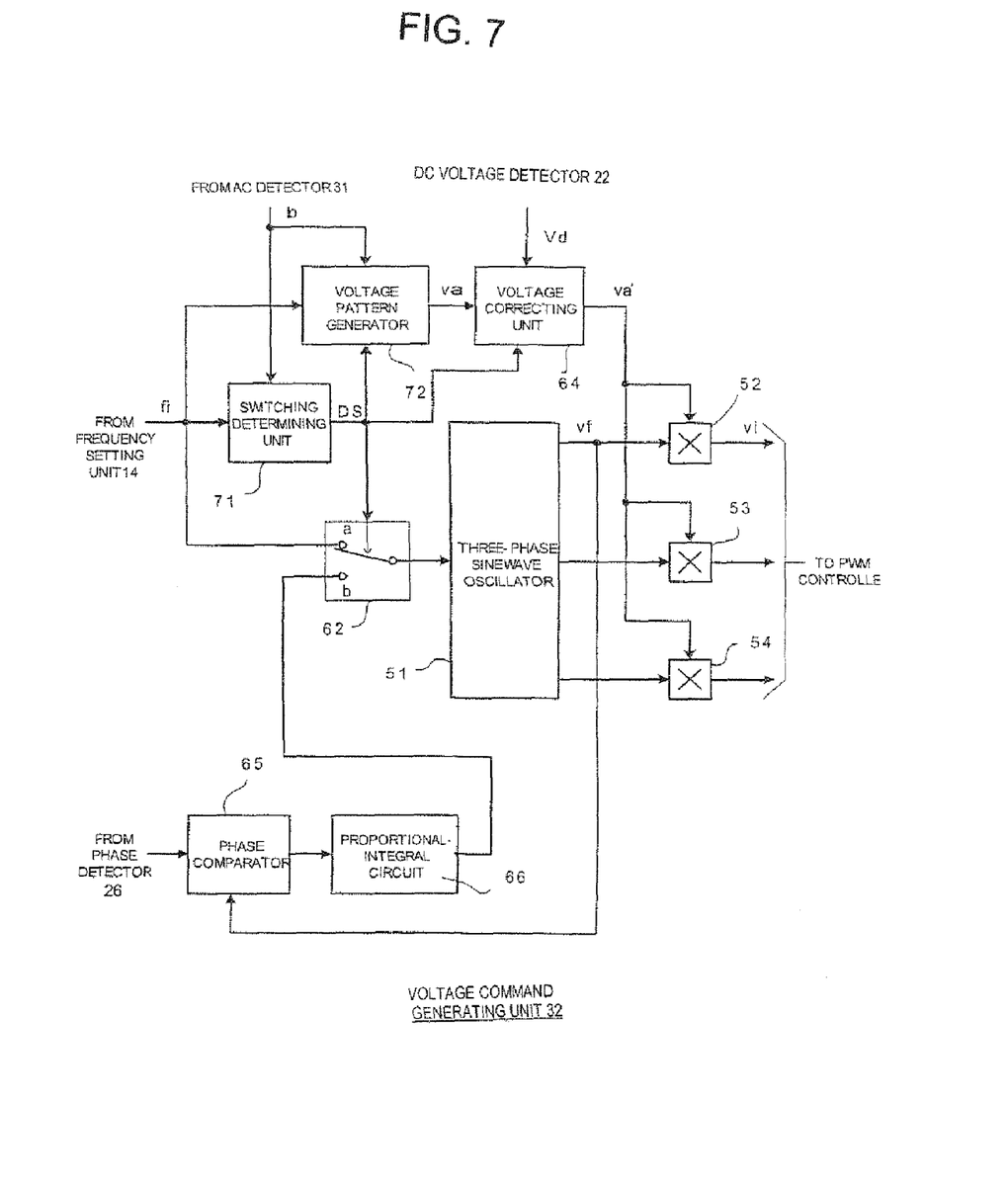
FIG. 7 is a circuit diagram illustrating the detailed circuit structure of a portion of the inverter apparatus shown in FIG. 6.

FIG. 7 shows the detailed circuit structure of the voltage command generating unit 32. In FIG. 7, components having the same functions as those shown in FIG. 2 are denoted by the same reference numerals.

The voltage command generating unit 32 includes a switching determining unit 71 and a voltage pattern generator 72 instead of the switching determining unit 61 and the voltage pattern generator 63 shown in FIG. 2.

Figure 8:
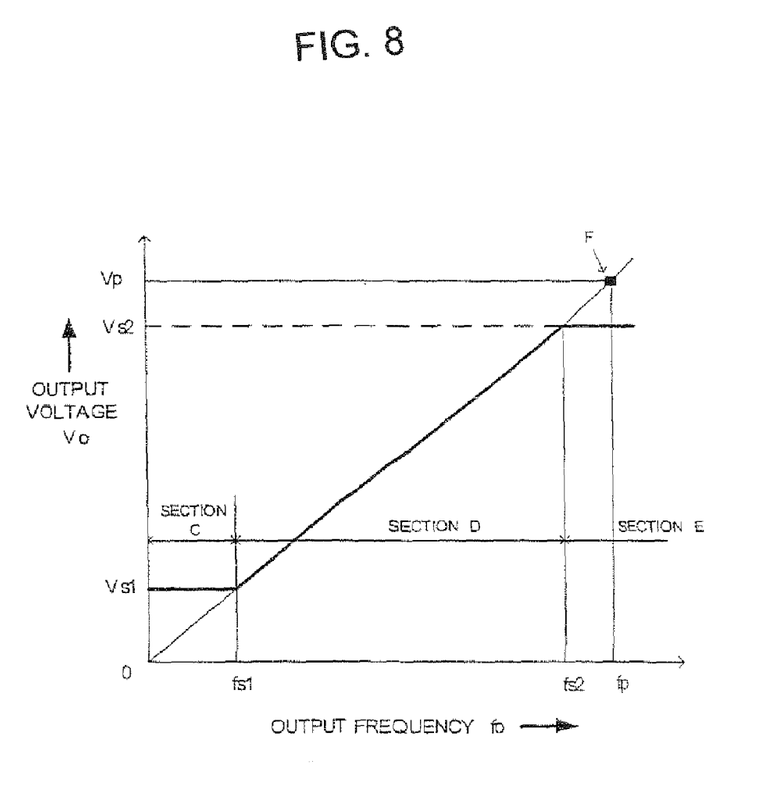
FIG. 8 is a characteristic diagram illustrating the operation of the inverter apparatus shown in FIG. 6.

FIG. 8 is a characteristic diagram illustrating the relationship between an output voltage Vo and an output frequency fo of the inverter apparatus 30.

In the inverter apparatus 30, the switching determining unit 71 of the voltage command generating unit 32 determines the magnitude of a frequency command value fi set by the frequency setting unit 14 and the magnitude of an output current Io of the inverter circuit 13 that is detected by the AC detector 31. That is, as shown in FIG. 8, the switching determining unit 71 determines the magnitude of the frequency command value fi, using a second frequency fs2 that is about 85 to 90% of the frequency fp of the voltage of the AC input power supply 1 as a reference frequency. In addition, the switching determining unit 71 determines the magnitude of the output current Io, using a rated output current Ir of the inverter apparatus 30 as a reference current. The switching determining unit 71 generates the determining signal DS when the frequency command value fi is more than the second frequency fs2 and the output current Io is larger than the rated output current Ir, and outputs the determining signal DS to the switch 62, the voltage pattern generator 72, and the voltage correcting unit 64.

A voltage pattern for allowing the relationship between the output voltage amplitude command value va and the frequency command value fi output from the frequency setting unit 14 to satisfy a characteristic line, which is represented by a solid line in FIG. 8, is set to the voltage pattern generator 72.

As shown in FIG. 8, when the frequency command value fi is less than a predetermined first frequency fs1 (section C), the voltage pattern generator 72 generates a voltage amplitude command value va1 for allowing the output voltage Vo to be a constant boost voltage Vs1. When the frequency command value fi is within the range from the first frequency fs1 to the second frequency fs2 (section D), the voltage pattern generator 72 generates the voltage amplitude command value va in proportional to the frequency command value fi. When the frequency command value fi is more than the second frequency fs2 in the vicinity of the frequency fp of the voltage of the AC input power supply 1, the voltage pattern generator 72 generates a voltage amplitude command value va2 for allowing the output voltage Vo to be equal to a voltage Vs2 that is obtained by subtracting a ripple voltage vr of the DC intermediate circuit from the voltage Vp of the AC input power supply 1.

Next, the operation of the inverter apparatus 30 having the above-mentioned structure will be described with reference to the characteristic diagram shown in FIG. 8.

First, during a normal operation of the inverter apparatus 30, the switching determining unit 71 does not generate the determining signal DS, and the switching contact is connected to the contact a that is connected to the frequency setting unit in the switch 62. Therefore, the frequency command value fi set by the frequency setting unit 14 is input to the three-phase sine wave oscillator 51, and the three-phase sine wave oscillator 51 generates an output voltage command vf having a frequency in proportional to the frequency command value fi. The output voltage command vf is input to the PWM controller 16 through the multipliers 52 to 54.

Meanwhile, when the frequency command value fi is less than the first frequency fs1 (section C), the voltage pattern generator 72 generates a constant voltage amplitude command value va1 corresponding to the constant boost voltage Vs1 (see FIG. 8). When the frequency command value fi is within the range between the first frequency fs1 and the second frequency fs2 (section D), the voltage pattern generator 72 generates the voltage amplitude command value va in proportional to the frequency command value fi. When the frequency command value fi is within a predetermined range that is more than the second frequency fs2 and includes the AC input power supply voltage frequency fp, the voltage pattern generator 72 generates a voltage amplitude command value va2 corresponding to the voltage Vs2 that is obtained by subtracting a ripple voltage (see FIG. 4A) from the voltage rectified by the DC intermediate circuit.

The voltage command generating unit 32 is provided with the voltage correcting unit 64 that corrects output voltage va from the voltage pattern generator 72 according to a voltage variation due to a ripple voltage (see FIG. 4) included in DC voltage by a rectifying circuit. Similar to the first embodiment, the voltage correcting unit 64 divides the voltage amplitude command value va output from the voltage pattern generator 72 by a DC voltage Vd of the DC intermediate circuit that is detected by the DC voltage detector 22 to calculate a corrected value va' of the voltage amplitude command value va, and outputs the corrected value va' to the multipliers 52 to 54.

During a normal operation, the multipliers 52 to 54 multiply the voltage command va' indicating the amplitude of the voltage output from the voltage correcting unit 64 by the voltage command vf indicating the frequency output from the three-phase sine wave oscillator 51 to calculate an output voltage command signal vi, and output the output voltage command signal vi to the PWM controller 16. The PWM controller 16 converts the output voltage command signal vi into a PWM control signal, which is used to control the on or off states of the transistors of the inverter circuit 13. In this way, an AC output voltage Vo varies according to the output frequency fo from the inverter circuit 13 as shown in a solid characteristic line in FIG. 8. That is, when the output frequency fo is lower than the first frequency fs1, the output voltage Vo is represented as a constant boost voltage Vs1. When the output frequency Vo is in the range from the first frequency fs1 to the second frequency fs2, the output voltage Vo varies in proportional to the output frequency fo. When the output frequency fo is higher than the second frequency fs2, the output voltage Vo is fixed to a constant voltage Vs2.

In the section E in which the frequency command value fi is more than the second frequency fs2, during the operation of the inverter apparatus 30, when the detection value of the AC detector 31 is larger than the rated current Ir of the AC motor 2 (in an over-current state), the switching determining unit 71 detects the over-current and immediately generates the determining signal DS. Then, the switching determining unit 71 outputs the determining signal DS to the switch 62, the voltage pattern generator 72, and the voltage correcting unit 64.

Then, the switch 62 switches the switching contact to the contact b that is connected to the proportional-integral circuit 66, and a PLL circuit composed of the phase comparator 65, the proportional-integral circuit 66, and the three-phase sine wave oscillator 51 is formed. In this way, PLL control is performed.

In this state, the output frequency from the three-phase sine wave oscillator 51 is controlled such that the phase of the output voltage is equal to that of the voltage of the AC input power supply 1 that is detected by the phase detector 24. Therefore, the output voltage Vo of the inverter circuit 13 is synchronized with the voltage of the AC input power supply 1, that is, the ripple voltage of the DC voltage of the DC intermediate circuit. As a result, the output frequency fo of the inverter apparatus 30 is fixed to a frequency that is equal to the frequency fp of the voltage of the AC input power supply 1, regardless of the frequency command value fi.

When receiving the determining signal DS, the voltage pattern generator 72 generates a voltage amplitude command value vap corresponding to the frequency fp of the voltage of the AC input power supply 1, as described above. When receiving the determining signal DS, the voltage correcting unit 64 stops a correcting operation. Therefore, the voltage amplitude command value vap output from the voltage pattern generator 72 is input to the multipliers 52 to 54 without any change. Then, the multipliers 52 to 54 multiply the amplitude command value vap by the voltage command vf output from the three-phase sine wave oscillator 51 to calculate an output voltage command signal vi. The output voltage command signal vi instructs the inverter circuit to generate a frequency and an amplitude value that are respectively equal to the frequency fp of the AC input power supply voltage and the amplitude value vp.

Therefore, when the frequency command value fi is more than the second frequency fs2 (section E) and the output current Io of the inverter circuit 13 is larger than the rated current Ir (in an over-current state), the operation point of the inverter apparatus 30 moves to a point F shown in FIG. 8.

That is, the output frequency fo of the inverter apparatus 30 changes to a frequency that is equal to the frequency fp of the voltage of the AC input power supply 1. As a result, the phase and height (amplitude) of a peak of the output voltage Vo from the inverter circuit 13 are equal to the phase and height (amplitude) of a peak of the ripple voltage included in the DC voltage of the DC intermediate circuit, as shown in FIG. 4, so that the peak of the output voltage Vo is synchronized with the peak of the voltage VP of the AC input power supply 1. Therefore, the amplitude of the output voltage Vo of the inverter circuit 13 increases up to a peak value Vpp of the ripple voltage included in the DC voltage of the DC intermediate circuit, so that the output voltage Vo is equal to the input power supply voltage Vp. In this way, the output voltage Vo of the inverter apparatus 30 increases and an over-current is prevented, which makes it possible to prevent the AC motor 2, which is a load, or an inverter apparatus from burning out.

In the third embodiment, the frequency set by an output voltage command signal is fixed to a frequency that is equal to the frequency of the voltage of the AC input power supply 1. According to this structure, when a current that is larger than a rated current flows to the AC motor 2, which is a load, an output frequency of the inverter apparatus 30 is fixed to a frequency that is equal to the frequency of the voltage of the AC input power supply 1, which makes it possible to prevent a frequency control range from being narrowed.

Further, the voltage command generating unit 32 is provided with the voltage correcting unit 64 that synchronizes the output voltage from the voltage pattern generator 72 with the ripple voltage (see FIG. 4) having a relatively large amplitude that is included in the rectified voltage. The voltage correcting unit 64 divides the output value from the voltage pattern generator 72 by the detection value of the DC voltage detector 22, and performs voltage correcting control, that is, automatic voltage regulation (AVR) control using the divided result as an amplitude value of a new output voltage command signal.

In the third embodiment shown in FIG. 6, instead of the AC input power supply voltage phase detector 26, the AC voltage detector 23 and the AC input power supply voltage phase detector 24 shown in FIG. 1 may be provided to detect the phase of the voltage of the AC input power supply 1 on the basis of the detection value of an AC input power supply voltage.

What is claimed is:

1. A voltage-source inverter apparatus comprising:
    a rectifying circuit that rectifies a three-phase AC voltage of an AC input power supply;
    a voltage command generating unit that generates a voltage command signal having a frequency set by a frequency setting unit; and
    an inverter circuit that converts a DC voltage rectified by the rectifying circuit into a three-phase AC output voltage having predetermined frequency and amplitude, which is subjected to pulse width modulation (PWM) control, on the basis of the output voltage command signal generated by the voltage command generating unit,
    wherein the inverter apparatus is a voltage-source inverter, and
    wherein the voltage command generating unit is provided with a voltage synchronizing unit that synchronizes the output voltage command signal generated by the voltage command generating unit with a ripple voltage generated by a DC intermediate circuit provided between the rectifying circuit and the inverter circuit to synchronize the three-phase AC output voltage of the inverter with the ripple voltage generated by the DC intermediate circuit.

2. The inverter apparatus according to claim 1,
    wherein, when the frequency of the output voltage command signal is within a predetermined range including the frequency of the voltage of the AC input power supply, the voltage synchronizing unit fixes the frequency of the output voltage command signal to a frequency that is equal to the frequency of the voltage of the AC input power supply, and synchronizes the output voltage command signal with the ripple voltage of the DC intermediate circuit.

3. The inverter apparatus according to claim 1,
    wherein, when the frequency of the output voltage command signal is within a predetermined range including the frequency of the voltage of the AC input power supply and only when a current output from the inverter circuit is larger than a predetermined upper limit, the voltage synchronizing unit fixes the frequency of the output voltage command signal to a frequency that is equal to the frequency of the voltage of the AC input power supply, and synchronizes the output voltage command signal with the ripple voltage of the DC intermediate circuit.

4. The inverter apparatus according to claim 1,
    wherein the voltage synchronizing unit detects the phase of the voltage of the AC input power supply and synchronizes the output voltage command signal with the ripple voltage of the DC intermediate circuit on the basis of the detected phase.

5. The inverter apparatus according to claim 1,
    wherein the voltage synchronizing unit detects the phase of the ripple voltage and synchronizes the output voltage command signal with the ripple voltage of the DC intermediate circuit on the basis of the detected phase.

6. The inverter apparatus according to claim 1,
    wherein the voltage command generating unit includes a voltage correcting unit that corrects the voltage of the output voltage command signal on the basis of the ripple voltage of the DC intermediate circuit.

7. The inverter apparatus according to claim 2,
    wherein the voltage synchronizing unit detects the phase of the ripple voltage and synchronizes the output voltage command signal with the ripple voltage of the DC intermediate circuit on the basis of the detected phase.

8. The inverter apparatus according to claim 3,
    wherein the voltage synchronizing unit detects the phase of the ripple voltage and synchronizes the output voltage command signal with the ripple voltage of the DC intermediate circuit on the basis of the detected phase.

9. The inverter apparatus according to claim 2,
    wherein the voltage command generating unit includes a voltage correcting unit that corrects the voltage of the output voltage command signal on the basis of the ripple voltage of the DC intermediate circuit.

10. The inverter apparatus according to claim 3,
    wherein the voltage command generating unit includes a voltage correcting unit that corrects the voltage of the output voltage command signal on the basis of the ripple voltage of the DC intermediate circuit.

11. The inverter apparatus according to claim 4,
    wherein the voltage command generating unit includes a voltage correcting unit that corrects the voltage of the output voltage command signal on the basis of the ripple voltage of the DC intermediate circuit.

12. The inverter apparatus according to claim 5,
    wherein the voltage command generating unit includes a voltage correcting unit that corrects the voltage of the output voltage command signal on the basis of the ripple voltage of the DC intermediate circuit.

13. The inverter apparatus according to claim 7,
    wherein the voltage command generating unit includes a voltage correcting unit that corrects the voltage of the output voltage command signal on the basis of the ripple voltage of the DC intermediate circuit.

14. The inverter apparatus according to claim 8,
    wherein the voltage command generating unit includes a voltage correcting unit that corrects the voltage of the output voltage command signal on the basis of the ripple voltage of the DC intermediate circuit.

15. The inverter apparatus according to claim 2,
    wherein the voltage synchronizing unit detects the phase of the voltage of the AC input power supply and synchronizes the output voltage command signal with the ripple voltage of the DC intermediate circuit on the basis of the detected phase.

16. The inverter apparatus according to claim 3,
    wherein the voltage synchronizing unit detects the phase of the voltage of the AC input power supply and synchronizes the output voltage command signal with the ripple voltage of the DC intermediate circuit on the basis of the detected phase.

17. The inverter apparatus according to claim 15,
wherein the voltage command generating unit includes a voltage correcting unit that corrects the voltage of the output voltage command signal on the basis of the ripple voltage of the DC intermediate circuit.

18. The inverter apparatus according to claim 16,
wherein the voltage command generating unit includes a voltage correcting unit that corrects the voltage of the output voltage command signal on the basis of the ripple voltage of the DC intermediate circuit.

19. A voltage-source inverter apparatus comprising:
a voltage rectifying circuit that voltage rectifies a three-phase AC voltage of an AC input power supply into a DC voltage;
a film capacitor connected across an output of the voltage rectifying circuit;
a DC voltage detector that detects a voltage formed between both ends of the film capacitor;
an AC voltage detector that detects a voltage of the AC input power supply and provides a detection value of the voltage of the AC input power supply;
an AC input power supply voltage phase detector that detects the phase of the voltage of the AC input power supply based on the detection value of the AC voltage detector;
a voltage command generating unit that generates a voltage command signal having a frequency set by a frequency setting unit, the voltage command generating unit having an input from the AC input power supply voltage phase detector to receive the detected phase of the voltage of the AC input power supply; and
an inverter circuit that converts a DC voltage rectified by the rectifying circuit into a three-phase AC output voltage having predetermined frequency and amplitude, which is subjected to pulse width modulation (PWM) control, on the basis of the output voltage command signal generated by the voltage command generating unit, the inverter circuit being connected across both ends of the film capacitor so that the film capacitor is provided between the rectifying circuit and the inverter circuit,
wherein the voltage command generating unit comprises a voltage synchronizing unit that synchronizes the output voltage command signal generated by the voltage command generating unit with a ripple voltage generated by the film capacitor provided between the rectifying circuit and the inverter circuit to synchronize the three-phase AC output voltage from the inverter with a ripple voltage of the film capacitor.

20. A voltage-source inverter apparatus comprising:
a voltage rectifying circuit that voltage rectifies a three-phase AC voltage of an AC input power supply into a DC voltage;
a DC voltage intermediate circuit connected across an output of the voltage rectifying circuit;
a DC voltage detector that detects a voltage formed by the DC voltage intermediate circuit;
an AC voltage detector that detects a voltage of the AC input power supply and provides a detection value of the voltage of the AC input power supply;
an AC input power supply voltage phase detector that detects the phase of the voltage of the AC input power supply based on the detection value of the AC voltage detector;
a voltage command generating unit that generates a voltage command signal having a frequency set by a frequency setting unit, the voltage command generating unit having an input from the AC input power supply voltage phase detector to receive the detected phase of the voltage of the AC input power supply; and
an inverter circuit that converts a DC voltage rectified by the rectifying circuit into a three-phase AC output voltage having predetermined frequency and amplitude, which is subjected to pulse width modulation (PWM) control, on the basis of the output voltage command signal generated by the voltage command generating unit, the inverter circuit being connected across the DC voltage intermediate circuit so that the DC voltage intermediate circuit is provided between the rectifying circuit and the inverter circuit,
wherein the voltage command generating unit comprises a voltage synchronizing unit that synchronizes the output voltage command signal generated by the voltage command generating unit with a ripple voltage generated by the DC intermediate circuit provided between the rectifying circuit and the inverter circuit to synchronize the three-phase AC output voltage from the inverter with a ripple voltage of the DC voltage intermediate circuit.

* * * * *